3,125,605
PROCESS FOR THE PRODUCTION OF ALCOHOLS
Karl Büchner, Oberhausen-Sterkrade, Josef Meis, Oberhausen-Osterfeld, and Otto Roelen, Oberhausen-Holten, Germany, assignors to Ruhrchemie Aktiengesellschaft, Oberhausen-Holten, Germany, a German corporation
No Drawing. Filed Sept. 10, 1958, Ser. No. 760,077
Claims priority, application Germany Sept. 18, 1957
9 Claims. (Cl. 260—635)

The present invention relates to the production of alcohols by hydrogenation of carboxyl and aldehyde moieties of organic compounds and has as its object to provide an improved method for the production of alcohols from such materials.

Hydrogenation of aldehydes or carboxylic acids in the liquid phase to produce alcohols is known. However, yields are not always satisfactory. As can easily be found by experiments, they depend on the carbon number of the starting material, the type of catalyst used, the excess of hydrogen employed, and other factors. Matters are even more complicated if carboxylic acids are present besides aldehydes, which is often the case, for example, when working with the liquid product obtained, from hydrogenating carbon monoxide using iron catalysts.

It has been found that the production of alcohols from aldehydes or carboxylic acids or mixtures thereof by admixing hydrogen, a hydrogenation catalyst and the aldehyde, carboxylic acid or mixture thereof and maintaining the resulting admixture at an elevated temperature and pressure for a time sufficient to permit the formation of alcohol, is improved by including in the admixture a water-soluble lower alcohol containing at least 2 carbon atoms.

The improved results realized by practicing production of alcohols according to the invention are that the formation of the alcohol can be effected in a single step, and an anhydrous reaction medium is not required. In some cases where the medium is aqueous, i.e. contains water, two steps for carrying out the method will be advantageous. This will depend on the amount of water present.

As regards starting materials suitable for use in the method of the invention, any aldehyde or carboxylic acid which can be converted to alcohol by the known catalytic hydrogenation of such material to alcohols, can be used. Moreover, mixtures of such materials can be used. In a distinctive embodiment of the invention the starting material is an organic compound containing at least one carboxyl group and at least one aldehyde group and both types of groups are converted to alcohol groups so that polyhydric alcohols are produced. This distinctive embodiment is considered in more detail hereinafter.

In respect to suitable hydrogenation reaction conditions of temperature and pressure the method of the invention is like the known method of producing alcohols by catalytic hydrogenation from materials such as are used as the starting materials used herein. Where polyhydric alcohols are produced according to the invention, the reaction conditions of temperature and pressure are similar to those usually employed for the reduction of fatty acid esters to form fatty alcohols. Thus, the pressure is maintained above about 700 p.s.i. and preferably above about 1400 p.s.i. and the temperature is maintained above 150° C. and preferably between 200° C. and 300° C. As regards the catalysts employed, again hydrogenation catalysts known for alcohol production by catalytic hydrogenation of aldehydes and carboxylic acids can be employed. A preferred catalyst is oxidic copper oxide-chromium oxide hydrogenation catalyst and this catalyst can contain additions of zinc and/or barium compounds. For the production of polyhydric alcohols as described above the catalyst is advantageously commercial copper oxide-chromium oxide catalyst and the amount of catalyst used can be, for example, in a batchwise operation 5% by weight based on the weight of the total reaction mixture.

As stated above suitable alcohols for the purpose of the invention are water-soluble lower alcohols containing at least 2 carbon atoms. Thus, aliphatic alcohols containing from 2 to 5 carbon atoms can be used. Ethyl alcohol and isopropanol can conveniently be used and isopropanol is a preferred alcohol. The amount of alcohol employed is not critical. Some improvement is realized upon the addition of small amounts, for optimum results a substantial amount, e.g. an amount equal in volume to the amount of starting material used, is employed and the use of excessive amounts is not recommended because it merely dilutes the reaction medium excessively and is uneconomical.

Methanol is not equally suitable as other lower alcohols. At the temperatures used in the process according to the invention, methanol will be split with formation of carbon monoxide which is detrimental to the hydrogenation catalyst. To counteract this in, e.g. hydrogenating fatty acids diluted with methanol, or fatty acid-methyl esters, it has been proposed to employ a very great excess of hydrogen, the excess amounts of hydrogen removing the carbon monoxide. This measure will not be necessary when using alcohols having 2 and more carbon atoms per molecule according, to the invention.

The use of methanol can be compared with the use of isopropanol which has been found to be particularly well suited. When using methanol, the hydrogenation, as may be seen from Example 1, will be nearly completed only after change of gas and 10 hours of reaction time, whereas when using isopropanol the hydrogenation will be already completed after as short a reaction period as 4 hours. When using methanol, the residual gas must be given up for lost because of its content of $CO$ and $CO_2$ while when using isopropanol according to the invention, it will contain only isopropanol which has no detrimental effect, so that it can be used again.

The reaction medium can be that of the known method of catalytic hydrogenation to alcohols of the starting materials employed herein. Thus there can be involved a two phase system in which hydrogen is present in gas phase and the starting material and product alcohol are present in liquid phase which also contains water-soluble lower alcohol used according to the invention. The catalyst is dispersed in the liquid phase.

As stated above, the reaction medium can be aqueous. Hence the alcohol used for diluting need not be absolutely free from water. No difficulties are caused in the hydrogenation by water contents of 2 to 5%. For hydrogenation in batch operation, it is even possible to use as the diluting agent an azeotropic mixture of water and isopropanol boiling at 80.4° C. and consisting of 87.2% of isopropanol and 12.8% of water, while increasing the quantity of catalyst added by 50%. However, in this case, the catalyst must be subjected to drying and oxidation prior to being used for a second batch. That the reaction medium can be aqueous is surprising since strict care had to be taken up to the present that any water present or forming during the hydrogenation was kept away from oxidic catalysts.

As polyhydric alcohols there can be produced according to the invention dialcohols from aldehyde carboxylic acids. Although it was feared that, when diluting with lower alcohols, acetals would be formed, the hydrogenation of the aldehyde carboxylic acids also proceeds smoothly. When operating in this manner, the aldehyde group as well as the carboxylic acid group are hydrogenated to form one alcohol group each in one operational step. Consisting of one step only, this process represents a considerable advance as compared with the proposal involving operation in 2 steps. The method of the invention can be employed to make polyhydric alcohols containing more than two hydroxy groups and is generally applicable to production of polyhydric alcohols from organic compounds, e.g. aliphatic compounds, containing one or more carboxyl groups and one or more aldehyde groups.

Organic compounds containing an aldehyde group and carboxyl group suitable for use as a starting material in the method of the invention can be derived by formylation and hydrogenation of an ethylenically unsaturated moiety of an ethylenically unsaturated acid containing from 18 to 22 carbon atoms. The fatty acid can be oleic acid, tall oil fatty acids, linoleic acid and the various train-oil fatty acids having between 18 and 22 carbon atoms. The aldehyde-carboxylic acids can be obtained from these acids by addition of carbon monoxide and hydrogen to the unsaturated carbon-carbon linkage according to the oxo synthesis process. When derived in this manner, the oxo synthesis product can be freed from the cobalt catalyst used for the formylation and then subjected to a treatment with hot water under pressure according to German Patent No. 879,839 thereby precipitating the carbonyls and simultaneously cleaving the acetals. They are then freed from water by allowing them to settle at 60° C. Following this, the anhydrous aldehyde-carboxylic acids are diluted with the lower alcohol for the hydrogenation to be effected in accordance with the invention.

Further details may be seen from the following examples which are given to illustrate the invention and not to limit the same.

*Example I*

Into a pressure vessel of steel lined with stainless steel and provided with a stirrer were placed 1200 cc. of oleic acid aldehyde, 1200 cc. of commercial methanol, and 120 grams of a commercial copper oxide-chromium oxide catalyst. The oleic acid aldehyde had the following characteristics:

| | |
|---|---|
| Iodine number | 7.4 |
| Neutralization number | 117 |
| Saponification number | 185 |
| Hydroxyl number | 22 |
| Carbonyl number | 54 |
| Melting range, °C | 30–100 |

After sealing of the autoclave, hydrogen was introduced until the pressure was 200 kg./cm.² while stirring and heating the autoclave to 285° C. Hydrogenation was now effected for 10 hours while maintaining the pressure at 300 kg./cm.² by means of hydrogen. Samples were taken from the liquid phase in the autoclave every hour and analyzed to determine the neutralization and saponification numbers which were as follows:

| | Neutralization No. | Saponification No. |
|---|---|---|
| After 1 hour | 1.9 | 87 |
| After 2 hours | 1.7 | 64 |
| After 4 hours | 1.6 | 35 |
| After 4 hours | 1.5 | 33 |
| After 5 hours | 1.1 | 30 |
| After 6 hours | 0.31 | 20 |

Since the hydrogenation did not proceed satisfactorily, a gas sample was drawn from the gas space of the autoclave and analyzed. The following values were found:

| | $CO_2$ | $C_nH_m$ | $O_2$ | $CO$ | $H_2$ | $C_nH_{2n+2}$ | $N_2$ |
|---|---|---|---|---|---|---|---|
| Vol. Percent | 22.3 | 0.5 | 0 | 6.2 | 67.2 | 2.0 | 1.8 |
| Carbon number: 1 | | | | | | | |

The gas was changed and another sample was taken which showed the following values:

| | $CO_2$ | $C_nH_m$ | $O_2$ | $CO$ | $H_2$ | $C_nH_{2n+2}$ | $N_2$ |
|---|---|---|---|---|---|---|---|
| Vol. Percent | 0.0 | 0.0 | 0.0 | 0.0 | 98.0 | 0.7 | 1.3 |

A gas sample taken after further two hours showed the following values:

| | $CO_2$ | $C_nH_m$ | $O_2$ | $CO$ | $H_2$ | $C_nH_{2n+2}$ | $N_2$ |
|---|---|---|---|---|---|---|---|
| Vol. Percent | 5.5 | 0.0 | 0.0 | 2.0 | 90.7 | 0.0 | 1.8 |

After 2 additional hours of hydrogenation, a sample taken of the reaction product showed a neutralization number of 0.29 and a saponification number of 8.7.

This example evidences the difficulties encountered when using methanol as the diluting agent. Methanol undergoes decomposition to form carbon monoxide and hydrogen, and part of the carbon monoxide is converted to form carbon dioxide. The hydrogenation could be brought to completion only after 10 hours and having changed the gas.

After having removed the catalyst by filtration, the product was fractionated at about 1 mm. Hg. The following fractions were obtained:

29.8% of $C_{18}$ alcohol,
62.7% of $C_{19}$ dialcohol,
7.5% of residue.

*Example II*

The same experiment as described in Example I was carried out under the same conditions and in the same autoclave except that ethyl alcohol was substituted for the methanol. The neutralization and saponification numbers of the reaction product were as follows:

| | Neutralization No. | Saponification No. |
|---|---|---|
| After 1 hour | 7.3 | 95 |
| After 2 hours | 4.7 | 80 |
| After 3 hours | 3.4 | 55 |
| After 4 hours | 2.5 | 44 |
| After 5 hours | 2.0 | 33 |
| After 7½ hours | 1.6 | 23 |
| After 8½ hours | 1.3 | 15 |
| After 9½ hours | 1.1 | 18 |

Gas samples taken after 5½ and 9½ hours showed the following values:

| Sample taken after | 5½ hours | 9½ hours |
|---|---|---|
| $CO_2$, percent by volume | 0 | 0 |
| $C_nH_m$, percent by volume | 0.0 | 0.0 |
| $O_2$, percent by volume | 0.0 | 0.0 |
| $CO$, percent by volume | 0.0 | 0.0 |
| $H_2$, percent by volume | 94.5 | 95.1 |
| $C_nH_{2n+2}$, percent by volume | 3.1 | 2.5 |
| $N_2$, percent by volume | 2.4 | 2.4 |
| Carbon number | 1.8 | 1.8 |

After separation of the catalyst, distillation in the manner described in Example I resulted in the following fractions:

40.0% of $C_{18}$ alcohol
53.8% of $C_{19}$ dialcohol
6.2% of residue

*Example III*

The same experiment as described in the preceding examples was carried out except that 1200 cc. of i-propanol was used instead of methanol or ethyl alcohol. The hydrogenation proceeded as follows:

|  | Neutralization No. | Saponification No. |
|---|---|---|
| After 1 hour | 6.2 | 79 |
| After 2 hours | 1.1 | 32 |
| After 3 hours | 0.6 | 18 |
| After 4 hours | 0.5 | 6 |

The residual gas had the following composition (in vol. percent):

| $CO_2$ | $C_nH_m$ | $O_2$ | CO | $H_2$ | $C_nH_{2n+2}$ | $N_2$ | Carbon No. |
|---|---|---|---|---|---|---|---|
| 0 | 0 | 0 | 0 | 90.9 | 4.2 | 4.9 | 2.67 |

Distillation resulted in 38.4% of $C_{18}$ alcohol,
56.8% of $C_{19}$ dialcohol,
4.8 of residue.

*Example IV*

The same experiment as described in Example III was carried out under the same conditions except that a mixture of 87.2 parts of i-propanol and 12.8 parts of water was used instead of i-propanol. Hydrogenation proceeded as follows:

|  | Neutralization No. | Saponification No. |
|---|---|---|
| After 1 hour | 39 | 131 |
| After 2 hours | 31 | 112 |
| After 3 hours | 26 | 92 |
| After 4 hours | 23 | 80 |
| After 6 hours | 10 | 31 |

Now, 60 grams of fresh catalyst were added and the hydrogenation was continued for additional 6 hours. Thereafter, the reaction product had a neutralization number of 1.4 and a saponification number of 4.

The catalyst was separated and the hydrogenation product was subjected to fractional distillation which resulted in 32.3% of $C_{18}$ alcohol,
62.2% of $C_{19}$ dialcohol,
5.5% of residue.

After drying and burning off, the catalyst was ready to be re-used.

We claim:

1. A method of producing dialcohols which comprises mixing an aldehyde carboxylic acid derived by formylation in accordance with the oxo process of an ethylenically unsaturated acid containing from 18 to 22 carbon atoms with a water-soluble lower alcohol containing at least two carbon atoms contacting said mixture with hydrogen in the presence of a copper oxide-chromium oxide hydrogenation catalyst at a temperature above 150° C. and a pressure above 700 p.s.i. for a time sufficient to form said dialcohol and recovering said dialcohol.

2. Method according to claim 1 in which said aldehyde carboxylic acid is obtained by subjecting oleic acid to the oxosynthesis.

3. Method according to claim 1 in which said water-soluble lower alcohol is isopropanol.

4. Method according to claim 1 in which said water-soluble lower alcohol is ethyl alcohol.

5. Method according to claim 1 in which said water-soluble lower alcohol contains from 2 to 5 carbon atoms in its molecule.

6. Method according to claim 1 in which the reaction medium contains water.

7. Method according to claim 6 in which the reaction medium contains from 2 to 5% of water.

8. Method according to claim 1 in which said water-soluble lower alcohol is isopropanol, the isopropanol being included in the admixture as a water-isopropanol azeotropic mixture boiling at 80.4° C.

9. Method according to claim 1 in which the reaction temperature employed is above 15° C. and the reaction pressure is above about 1400 p.s.i.

References Cited in the file of this patent
UNITED STATES PATENTS

| 2,009,948 | Schmidt et al. | July 30, 1935 |
| 2,080,419 | Green | May 18, 1937 |
| 2,248,465 | Rittmeister | July 8, 1941 |
| 2,844,633 | Braconier et al. | July 22, 1958 |

UNITED STATES PATENT OFFICE
CERTIFICATE OF CORRECTION

Patent No. 3,125,605　　　　　　　　　　　　March 17, 1964

Karl Büchner et al.

It is hereby certified that error appears in the above numbered patent requiring correction and that the said Letters Patent should read as corrected below.

Column 3, first table, column 1, line 3 thereof, for "After 4 hours" read -- After 3 hours --; column 5, line 24, for "4.8" read -- 4.8% --; column 6, line 39, for "15° C." read -- 150° C. --.

Signed and sealed this 14th day of July 1964.

(SEAL)

Attest:

ESTON G. JOHNSON
Attesting Officer

EDWARD J. BRENNER
Commissioner of Patents